(12) United States Patent
Chittigala

(10) Patent No.: US 8,489,842 B2
(45) Date of Patent: Jul. 16, 2013

(54) SYSTEM AND METHOD FOR FINDING KERNEL MEMORY LEAKS

(75) Inventor: Jes Kiran Chittigala, Hyderabad (IN)

(73) Assignee: CA, Inc., Islandia, NY (US)

( * ) Notice: Subject to any disclaimer, the term of this patent is extended or adjusted under 35 U.S.C. 154(b) by 793 days.

(21) Appl. No.: 12/685,406

(22) Filed: Jan. 11, 2010

(65) Prior Publication Data
US 2010/0115273 A1    May 6, 2010

Related U.S. Application Data

(63) Continuation of application No. 11/772,593, filed on Jul. 2, 2007, now Pat. No. 7,669,030.

(51) Int. Cl.
G06F 12/00 (2006.01)
G06F 13/00 (2006.01)

(52) U.S. Cl.
USPC ............ 711/170; 711/100; 711/154; 711/200

(58) Field of Classification Search
USPC .................................. 711/100, 154, 170, 200
See application file for complete search history.

(56) References Cited

U.S. PATENT DOCUMENTS

| | | | |
|---|---|---|---|
| 5,909,594 A * | 6/1999 | Ross et al. | 710/20 |
| 6,434,620 B1 | 8/2002 | Boucher et al. | 709/230 |
| 6,480,918 B1 | 11/2002 | McKenney et al. | 710/200 |
| 6,785,888 B1 * | 8/2004 | McKenney et al. | 718/104 |
| 6,986,016 B2 | 1/2006 | Patil | 711/203 |
| 7,472,233 B2 | 12/2008 | McKenney et al. | 711/147 |
| 7,500,074 B2 * | 3/2009 | Cholleti et al. | 711/165 |
| 7,669,030 B2 | 2/2010 | Chittigala | 711/170 |
| 7,673,181 B1 * | 3/2010 | Lindo et al. | 714/38.13 |
| 2005/0168472 A1 | 8/2005 | Gosalia et al. | 345/543 |

* cited by examiner

*Primary Examiner* — Tuan V. Thai
(74) *Attorney, Agent, or Firm* — Pillsbury Winthrop Shaw Pittman LLP

(57) ABSTRACT

The invention provides a system and method for tracking memory information associated with dynamically loaded kernel modules with the help of a tracking system. The tracking system defines its own kernel memory allocation functions. Whenever, a dynamic kernel module is loaded/unloaded into/from the kernel space, these newly defined functions are called in response to kernel memory allocation/de-allocation requests from the kernel module. The newly defined functions are responsible for allocating and de-allocating kernel memory, as well as, keeping track of information relating to the kernel memory allocations/de-allocations. The tracked information may be used to identify the source of kernel memory leaks.

14 Claims, 3 Drawing Sheets

SYSTEM AND METHOD FOR FINDING KERNEL MEMORY LEAKS

CROSS-REFERENCE TO RELATED APPLICATIONS

This application is a continuation of U.S. patent application Ser. No. 11/772,593, entitled "System and Method for Finding Kernel Memory Leaks," filed Jul. 2, 2007, now U.S. Pat. No. 7,669,030 the contents of which are hereby incorporated by reference in their entirety.

FIELD OF THE INVENTION

The invention relates to a system and method for tracking/gathering memory information associated with dynamically loaded kernel modules with the help of a tracking system, wherein the tracked/gathered information is used to find kernel memory leaks.

BACKGROUND OF THE INVENTION

System memory in an operating system (OS) is divided into two distinct regions: kernel space and user space. Kernel space hosts the kernel or core of the OS. The kernel manages the system's resources (for example, memory, processors, I/O devices, and other resources) and communication between hardware and software components. User space is the region in which user processes/applications (i.e., not the kernel) run. The kernel space can be accessed by the user processes through the use of system calls in order to gain access to the services provided by the kernel.

In some instances, kernel modules (for example, device drivers, network drivers, file systems, and other kernel modules) are dynamically loaded into the kernel space whenever a demand for a new component arises. When a kernel module is loaded into the kernel space, a sufficient amount of kernel memory is allocated to it via a request such as, for example, user space requests through system calls, hardware requests while handling interrupts, or other requests. When a kernel module is unloaded from the kernel space, the allocated kernel memory should be de-allocated from the unloaded module and, as such, should be usable for other purposes.

Typically, the kernel resolves references to kernel memory allocation and de-allocation function addresses from the loaded kernel module to carry out memory allocation and de allocation. In some instances, the kernel utilizes a kernel global symbol table to resolve these references, wherein the kernel global symbol table maintains a list of all the kernel's resources, functions and data types provided by the kernel, functions and data types provided by loaded modules, as well as, system calls.

Generally, a memory leak is caused by an application or by a process that allocates memory for use, but does not free the memory up when it is no longer needed. This may cause the operating system (OS) to hang or otherwise function improperly until the allocated memory is released, or may cause other problems. Accordingly, kernel memory leaks occur when kernel memory is allocated to a kernel module but not de-allocated when the module is unloaded.

Hence, there exists a need for a tracking system that tracks information regarding the kernel memory allocations/de-allocations to determine the existence and/or cause of a kernel memory leak.

SUMMARY OF THE INVENTION

The invention relates to a system and method for tracking/gathering memory information associated with dynamically loaded kernel modules. The invention substitutes newly defined functions for original functions used to allocate and de-allocate kernel memory and gathers information to identify and resolve kernel memory leaks.

In one embodiment, the invention includes a tracking system that is loaded in the kernel space of an operating system to track all the information regarding kernel memory allocations/de-allocations performed for dynamically loaded kernel modules. In some embodiments, the tracking system defines its own kernel memory allocation/de-allocation functions and replaces the addresses of all the existing allocation/de-allocation functions in the kernel global symbol table with the addresses of these newly defined functions. As such, whenever a dynamic kernel module is loaded into the kernel space, these newly defined functions are called in response to kernel memory allocation/de-allocation requests from the dynamic kernel module. These functions perform allocation and de-allocation of memory as well as track information regarding these kernel memory allocations/de-allocations. This tracked information may be used to identify and resolve kernel memory leaks.

In order to track kernel memory usage, many existing techniques require the recompilation of existing kernel modules, as the source code of the existing kernel modules must be modified to incorporate newly defined allocation/de-allocation functions. However, the tracking system of the invention detects kernel memory leaks for existing kernel modules without having to change the source code of the existing kernel modules. The tracking system of the invention does this by defining new allocation/de-allocation functions, and replacing the addresses of existing kernel memory allocation/de-allocation functions with the addresses of the newly defined functions. As such, whenever any kernel modules are loaded or unloaded into/from a kernel space, the newly defined functions of tracking system are called in response to kernel memory allocation/de-allocation requests from the kernel module.

These and other objects, features, and advantages of the invention will be apparent through the detailed description and the drawings attached hereto. It is also to be understood that both the foregoing summary and the following detailed description are exemplary and not restrictive of the scope of the invention.

DETAILED DESCRIPTION

The invention relates to a system and method for tracking memory information associated with dynamically loaded kernel modules. The invention includes a tracking system that interacts with dynamically loaded kernel modules at the time of allocation and de-allocation of kernel memory and tracks information regarding these allocations and de-allocations.

In some embodiments, the tracking system of the invention may be loaded into the kernel space of the OS and initialized. Thereafter, dynamic kernel modules may be loaded into the kernel space as demand arises. For each kernel module loaded in the kernel space, the tracking system defines its own kernel memory allocation functions. The term "allocation function" may refer to a function that either allocates kernel memory, de-allocates kernel memory, or both allocates and de-allocates kernel memory.

Whenever, a dynamic kernel module is loaded/unloaded into/from the kernel space, these newly defined allocation functions are called in response to kernel memory allocation/de-allocation requests from a dynamic kernel module. The newly defined allocation functions then allocate or de-allocate kernel memory to the dynamic kernel module and gathers/stores information relating to the kernel memory allocations/de-allocations. The gathered information enables identification of the source of kernel memory leaks.

Figure 1:
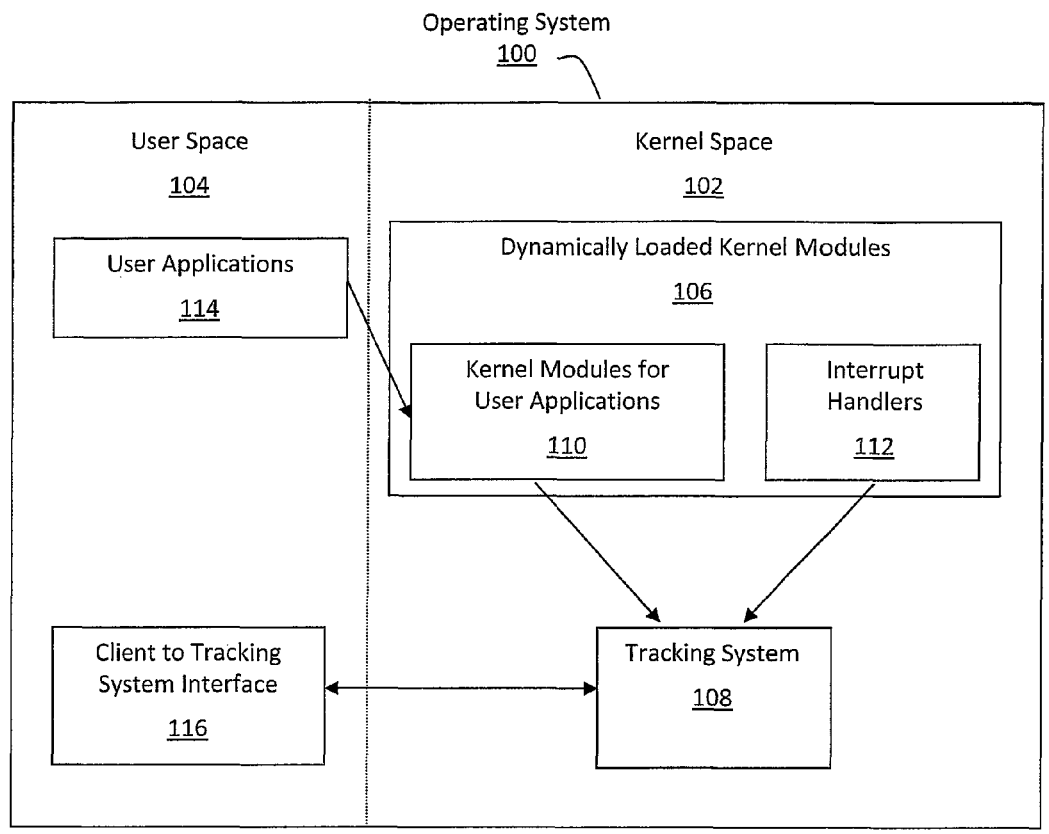
FIG. 1 illustrates an example of an operating system with a loaded tracking system, according to various embodiments of the invention.

FIG. 1 illustrates an example of an operating system 100 that may be divided into kernel space 102 and user space 104. In some embodiments, kernel space 102 may include a loaded kernel of tracking system 108. In addition to the tracking system 108, kernel space 102 may be loaded with one or more dynamically loaded kernel modules 106 as need arises. In some instances, the dynamically loaded kernel modules 106 may be divided into two groups: 1) all dynamic kernel modules that interact with user applications 114 in user space 104 (for example, device drivers, kernel daemons, or kernel module which would redefine system call behavior) and 2) interrupt handlers 112, which interact with system hardware. Tracking system 108 may interact with both these groups at the time of allocation, de-allocation of kernel memory, or at other times.

Tracking system 108 tracks and provides information regarding kernel memory allocations and de-allocations for the dynamically loaded kernel modules. For example, tracking system 108 may track the following information:
1) the identity of a kernel dynamic module that is responsible for the allocation/de-allocation of kernel memory,
2) whether the kernel memory is allocated/de-allocated as part of handling system call or interrupt,
3) if the memory is allocated/de-allocated because of a system call, the system call number that is responsible for allocation/de-allocation of kernel memory,
4) if the memory is allocated/de-allocated because of a interrupt, the interrupt number that is responsible for allocation/de-allocation of kernel memory,
5) the date/time of memory allocation/de-allocation,
6) the process name that is responsible for the allocation/de-allocation, and/or
7) other information regarding kernel memory allocations and de-allocations for the dynamically loaded kernel modules.

In some embodiments, a data structure (such as, table, array, file or record) may be maintained with all the tracked information. For example, in some embodiments, the data structure may at least include: 1) a module identity field indicating the kernel dynamic module that is responsible for the allocation/de-allocation of kernel memory, 2) a PID (process identification) field indicating the process name that is responsible for the allocation/de-allocation, 3) a flag field indicating whether kernel memory allocation/de-allocation is done due to a system call (flag is set) or an interrupt (flag is reset), 4) a system call/interrupt number field indicating either the system call or the interrupt number responsible for allocation/de-allocation (based on whether the flag is set or reset), and 5) a date/time field indicating the date and time when the kernel memory allocation/de-allocation is done.

In some embodiments, the data structure may be in a table form as follows:

```
Struct Tracking Info {
Char ModuleName[50];
Unsigned int pid;
Unsigned int interrupt_or_syscall;
Unsigned int intno_or_syscallno;
Time_t Time;
Unsigned int base_addr;
Unsigned int length;
Struct TrackInfo *next;
} Table[50];
```

In some embodiments, the invention includes, a client to tracking system interface 116 provided in user space 104. The client to tracking system interface 116 may be a user space program, via which the information that is tracked by tracking system 108 can be viewed in the user space. In some embodiments, client to tracking system interface 116 may include a graphical user interface that enables the tracked information to be viewed in real-time.

In some instances, a user may continuously monitor the tracking information using user display graphical user interface provided by client to tracking interface 116 to determine faulty memory allocations and appropriately delete the superfluous memory, thereby avoiding kernel memory leaks. For example, after an application in user space 104 is closed, there may be no need for kernel memory to be allocated for the application. By utilizing the tracking information related to the dynamic kernel module associated with the application (e.g., by comparing the corresponding PID) that is provided to the user via client to tracking interface 116, the user may determine that there indeed is superfluous memory allocated for the application. The user may then accordingly delete the allocated superfluous memory. In some embodiments, the user may also take corrective action by forcibly ending the application, or some other daemons, causing faulty memory allocations, thereby reducing the kernel memory leaks.

In some embodiments, client to tracking system interface 116 may also provide a rule management graphical user interface that enables a user to create one or more rules that perform one or more actions based on one or more conditions relating to kernel memory. In some embodiments, the user may define one or more functions that are invoked when a condition of a rule is met. For example, in some embodiments, a user may create a rule that executes a particular program or generates a particular signal to process when kernel memory usage exceeds a certain threshold.

In some embodiments, rules need not be created by a user, but may be predefined and/or supplied by a source other than the user. In some embodiments, the rule management graphical user interface may enable a user to alter predefined or non-user-created rules.

Figure 2:
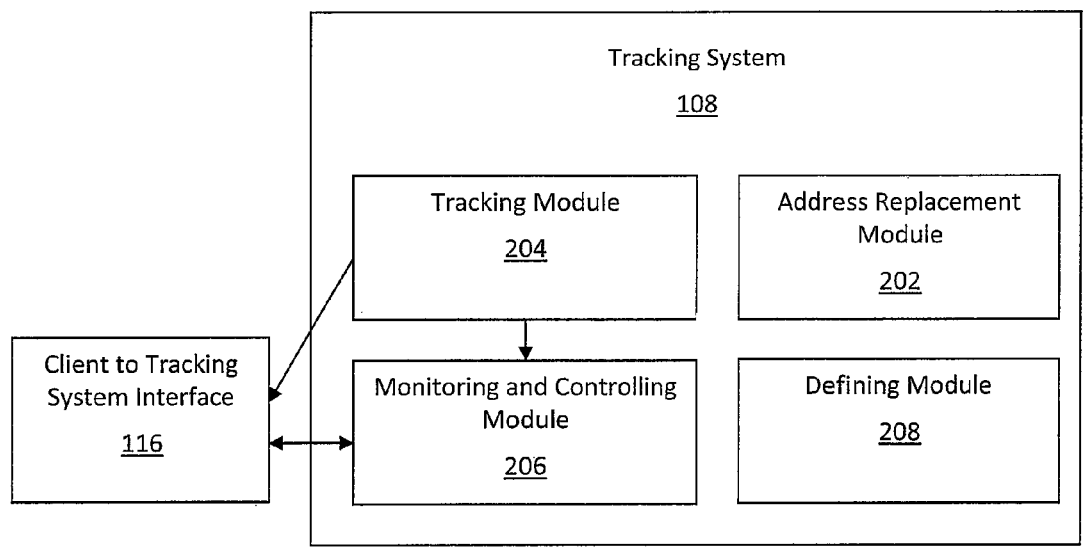
FIG. 2 illustrates an example of components of a tracking system, according to various embodiments of the invention.

FIG. 2 illustrates components of tracking system 108, which may include an address replacement module 202, a tracking module 204, a monitoring and controlling module 206, and a defining module 208. In some embodiments, tracking system 108 may be loaded into the kernel space of an operating system to track all kernel memory allocations and de-allocations performed by dynamically loaded kernel modules 106. As discussed above, tracking system 108 defines its own new kernel memory allocation functions that allocate or de-allocate kernel memory. In some embodiments, defining module 208 of tracking system 108 defines these new kernel memory allocation functions when tracking system 108 is loaded into the kernel space. These newly defined kernel memory allocation functions are used to allocate and de-allocate kernel memory, as well as, keep track of information relating to the kernel memory allocation/de-allocation (such, as, for example, an identity of a kernel module that is responsible for allocation/de-allocation, whether, kernel memory is allocated/de-allocated as part of handling system call or interrupt, or other information, as described above).

In some embodiments, tracking system 108 also includes address replacement module 202, which identifies all existing kernel memory allocation function addresses in the kernel space of the OS and replaces these existing addresses with the addresses of the newly defined functions of tracking system 108. In some embodiments, address replacement module 202 analyzes the kernel global symbol table of the kernel space to find the existing kernel memory allocation addresses and executes replacement of these addresses with the addresses of the new kernel memory allocation functions by substituting the addresses of the new functions in the kernel global symbol table. Once this address replacement takes place, whenever any dynamically loaded kernel modules 106 are loaded or unloaded into or from the kernel space, the newly defined functions of tracking system 108 will be called in response to kernel memory allocation/de-allocation requests from respective dynamically loaded kernel module. This will result in the allocation/de-allocation of kernel memory and the tracking of information relating to kernel memory allocation/de-allocation by tracking module 204.

Tracking of information regarding kernel memory allocation and de-allocation performed by the new kernel memory allocation modules may be carried out by tracking module 204 of tracking system 108. For example, in some embodiments, tracking module 204 may monitor the allocation and de-allocation activity of the new kernel memory allocation functions. Tracking module 204 may then log or otherwise store information regarding this activity in memory. This information may be stored locally in memory of the computer on which the tracking system is loaded or in transmitted to and stored in memory of another computer or computer system (e.g., the information may be transmitted across a network and/or logged in a database). This logged or stored information regarding kernel memory allocation and de-allocation may be utilized to monitor kernel memory allocation, identify kernel memory leaks, determine corrective actions regarding kernel memory leaks, and/or may be used for other purposes. For example, in some embodiments, the logged or stored information may be provided to a user (e.g., via a graphical user display interface of client to tracking system interface 116) to enable the user to identify kernel memory leaks and/or determine corrective action for kernel memory leaks.

In some embodiments, the logged or stared information may be applied against a set of one or more rules to identify and/or take corrective action regarding kernel memory leaks. For example, in some embodiments, the set of rules may be created by a user via a rule management graphical user interface of client to tracking system interface 116 or otherwise created and provided to monitoring and controlling module 206 of tracking system 108. Monitoring and controlling module 206 then receives the tracked information regarding kernel memory allocation and de-allocation from tracking module 204. Monitoring and controlling module 206 then applies the received information to the set of rules to determine if the conditions of one or more rules are met. Whenever a particular condition specified in a rule is met, the monitoring and controlling module 206 then performs an action as defined by the rule whose condition is met. For example, if kernel memory usage exceeds a defined threshold specified in a rule, monitoring and controlling module 206 may execute a particular program or generate a particular signal to a process that serves to correct the kernel memory leak (e.g., forcibly ending the kernel module responsible for the leak).

Figure 3:
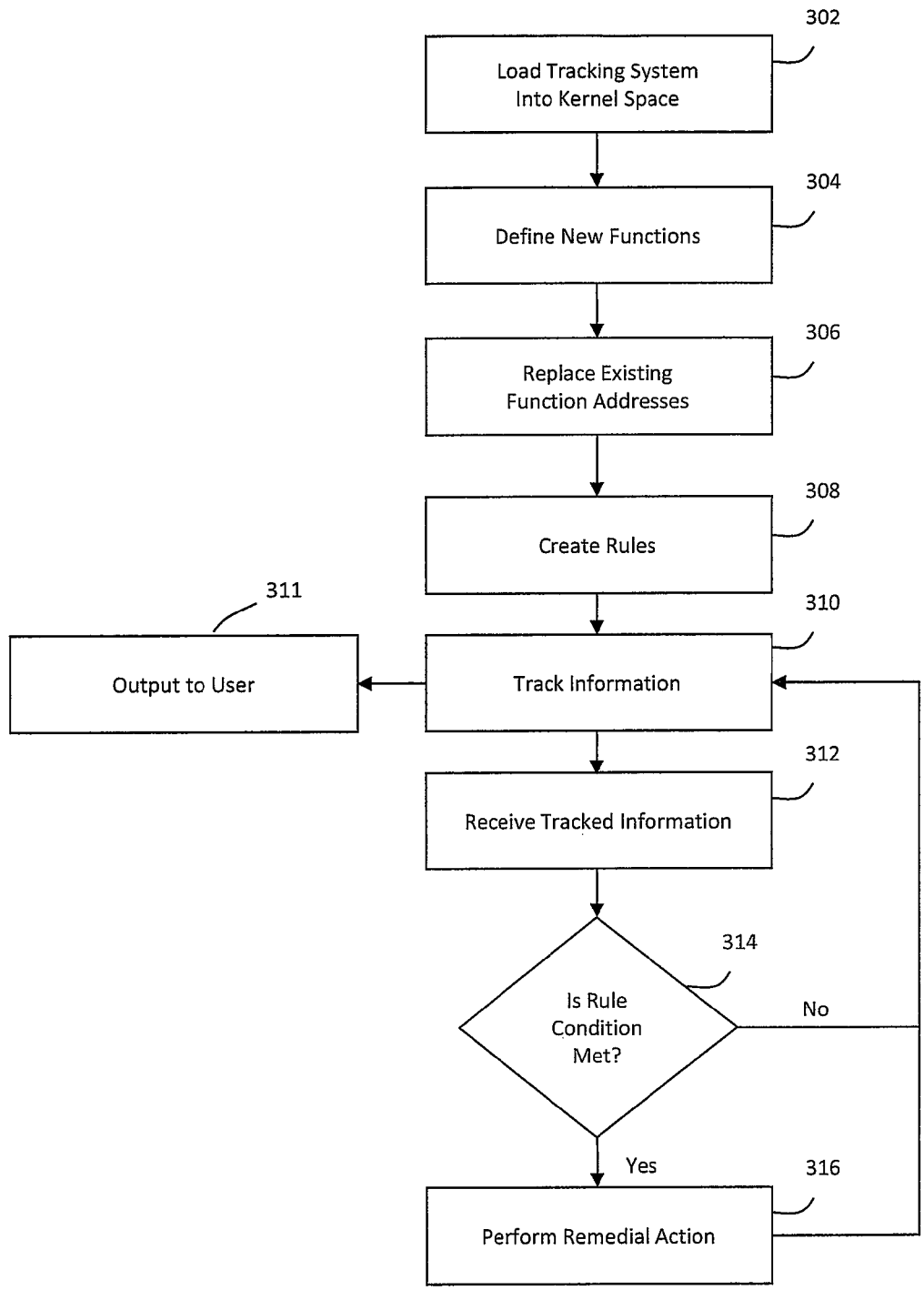
FIG. 3 illustrates an example of a process for tracking memory information of dynamically loaded kernel modules, according to various embodiments of the invention.

FIG. 3 illustrates a process 300, which is an example of a process for tracking memory allocation and de-allocation information associated with dynamically loaded kernel modules, according to various embodiments of the invention. In some embodiments, process 300 may include an operation 302, wherein a tracking system (e.g., tracking system 108) is loaded into a kernel space of an operating system. In an operation 304, the new kernel memory allocation functions may be defined. In some embodiments, a defining module (e.g., defining module 208) of the tracking system may define the new kernel memory allocation functions. These new defined functions may be used to allocate and de-allocate kernel memory as well as track information relating to the kernel memory allocation/de-allocation, such as, for example, an identity of a kernel module that is responsible for kernel memory allocation/de-allocation, whether kernel memory is allocated/de-allocated as part of handling system call or interrupt, or other information.

In an operation 306, all existing kernel memory allocation function addresses in the kernel global symbol table may be replaced with the addresses of the new kernel memory allocation functions. Thus, whenever a kernel module is loaded/unloaded into/from a kernel space, the newly defined functions of tracking system will be called in response to kernel memory allocation/de-allocation requests from the kernel module. This will result in the allocation/de-allocation of kernel memory and the tracking of information relating to the kernel memory allocation/de-allocation (see operation 310).

In some embodiments, process 300 may include an operation 308, wherein a user creates a set of one or more rules to take appropriate actions based on the condition of kernel memory. In some embodiments, these rules may include defined functions that are invoked depending on certain specified conditions. In some embodiments, the rules may be created via a rule management graphical user interface (e.g., an interface provided by client to tracking system interface 116).

In an operation 310, information regarding kernel memory allocation and/or de-allocation may be monitored and logged or otherwise stored (e.g., by a tracking module 204) for use (e.g., by users, application to a rules set, or other use). In some embodiments, in an operation 311, tracked information regarding kernel memory allocation and/or de-allocation may be output (e.g., via a display device, report, or by other method) to a user. For example, in some embodiments, a graphical user display interface of client to tracking system interface 116 may enable display of the tracked information to a user.

In an operation 312, a monitoring and controlling module (e.g., monitoring and controlling module 206) may receive the tracked information (e.g., from tracking module 204 or from a database or other storage area). In an operation 314, the monitoring and controlling module may apply, the tracked information to a set of rules (e.g., the rules defined by the user in operation 308 or other rules, such as, predefined rules) to determine if a condition of one or more, of the rules is met. If in operation 314, it is determined that a condition of one of the rules is met, then, in an operation 316, the monitoring and controlling module may perform one or more a corresponding actions as defined by the one or more rules whose conditions are met. For example, if kernel memory usage exceeds a defined threshold specified in a rule, the monitoring and controlling module may then execute a particular program or generate a particular signal to a process. If, in operation 314, a condition of one of the rules is not met, no action may be performed.

In some embodiments, the invention includes an article of manufacture comprising computer readable program code contained within, implementing one or more modules to track memory information for one or more dynamically loaded kernel modules. Furthermore, the invention includes a computer program code-based product, which may include storage medium having program code stored therein which can be used to instruct a computer to perform any of the operations, processes, methods, or functions described herein. The computer storage medium may include any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices. In some embodiments, software modules for performing the method operations described herein may be implemented in computer program code based products.

Those having skill in the art will appreciate that the invention described herein may work with any operating system configuration that incorporates the design and implementation of Linux. The invention may also work with operating systems having other configurations. Furthermore, the invention may be applied to any product/module executed/run in kernel space to check the vulnerabilities in kernel memory allocations. Also, more or less of the aforementioned system components may be used and/or combined in various embodiments. In some embodiments, the operations of the processes/methods described herein may be performed in an order different from the order given above and may include performance of additional operations. In some embodiments, not all operations may be necessary.

While the invention has been described with reference to the certain illustrated embodiments, the words that have been used herein are words of description, rather than words of limitation. Changes may be made, within the purview of the associated claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the associated claims.

What is claimed is:

1. A method to find a kernel memory leak, the method comprising:
   replacing an address associated with an existing kernel memory allocation function in a kernel space with a new address associated with a new kernel memory allocation function defined for a kernel module loaded in the kernel space;
   performing an allocation function in the new address using the new kernel memory allocation function in response to receiving a kernel memory allocation request from the kernel module loaded in the kernel space;
   storing information relating to the allocation function performed in the new address in the kernel space;
   tracking the stored information relating to the allocation function performed in the new address, wherein tracking the stored information relating to the allocation function comprises determining whether a condition defined in a rule has been met; and
   performing a predetermined function defined in the rule in response to determining that the condition has been met.

2. The method of claim 1, wherein the stored information relating to the allocation function is stored in a data structure having one or more selected from: a module name field, a PID field, a flag field, a system call field, an interrupt number field, or a date/time field.

3. The method of claim 1, wherein the information relating to the allocation function comprises one or more selected from: an identity for a kernel module that initiated the kernel memory allocation request, a system call number associated with the kernel memory allocation request, an interrupt number associated with the kernel memory allocation request, a date for the kernel memory allocation request, a time for the kernel memory allocation request, or a process name relating to the kernel memory allocation request.

4. The method of claim 1, wherein the allocation function performed in the new address comprises allocating kernel memory in the new address or de-allocating kernel memory in the new address.

5. A system to find a kernel memory leak, the system comprising:
   an address replacement module that replaces an address associated with an existing kernel memory allocation function in a kernel space with a new address associated with a new kernel memory allocation function defined for a kernel module loaded in the kernel space; and
   a monitoring and controlling module that:
     performs an allocation function in the new address using the new kernel memory allocation function in response to receiving a kernel memory allocation request from the kernel module loaded in the kernel space;
     stores information relating to the allocation function performed in the new address in the kernel space;
     tracks the stored information relating to the allocation function performed in the new address, wherein tracking the stored information relating to the allocation function comprises determining whether a condition defined in a rule has been met; and
     performs a predetermined function defined in the rule in response to determining that the condition has been met.

6. The system of claim 5, wherein the monitoring and controlling module stores the information relating to the allocation function in a data structure having one or more selected from: a module name field, a PID field, a flag field, a system call field, an interrupt number field, or a date/time field.

7. The system of claim 5, wherein the information relating to the allocation function comprises one or more selected from: an identity for a kernel module that initiated the kernel memory allocation request, a system call number associated with the kernel memory allocation request, an interrupt number associated with the kernel memory allocation request, a date for the kernel memory allocation request, a time for the kernel memory allocation request, or a process name relating to the kernel memory allocation request.

8. The system of claim 5, wherein the allocation function performed in the new address comprises allocating kernel memory in the new address or de-allocating kernel memory in the new address.

9. The system of claim 5, further comprising an interface to display the information regarding the allocation function to a user.

10. A computer program product comprising:
    a non-transitory computer readable storage medium comprising computer readable program code embodied therewith to find a kernel memory leak, the computer readable program code comprising:

computer readable program code configured to replace an address associated with an existing kernel memory allocation function in a kernel space with a new address associated with a new kernel memory allocation function defined for a kernel module loaded in the kernel space;

computer readable program code configured to perform an allocation function in the new address using the new kernel memory allocation function in response to receiving a kernel memory allocation request from the kernel module loaded in the kernel space;

computer readable program code configured to store information relating to the allocation function performed in the new address in the kernel space;

computer readable program code configured to track the stored information relating to the allocation function performed in the new address, wherein tracking the stored information relating to the allocation function comprises determining whether a condition defined in a rule has been met; and computer readable program code configured to perform a predetermined function defined in the rule in response to determining that the condition has been met.

11. The computer program product of claim 10, wherein the stored information relating to the allocation function is stored in a data structure having one or more selected from: a module name field, a PID field, a flag field, a system call field, an interrupt number field, or a date/time field.

12. The computer program product of claim 10, wherein the information relating to the allocation function comprises one or more selected from: an identity for a kernel module that initiated the kernel memory allocation request, a system call number associated with the kernel memory allocation request, an interrupt number associated with the kernel memory allocation request, a date for the kernel memory allocation request, a time for the kernel memory allocation request, or a process name relating to the kernel memory allocation request.

13. The computer program product of claim 10, wherein the allocation function performed in the new address is configured to allocate kernel memory in the new address or de-allocate kernel memory in the new address.

14. The computer program product of claim 10, further comprising computer readable program code configured to provide an interface to display the information regarding the allocation function to a user.

\* \* \* \* \*